(12) United States Patent
Garrison

(10) Patent No.: US 7,963,525 B1
(45) Date of Patent: *Jun. 21, 2011

(54) HYDRODYNAMIC CIRCUMFERENTIAL SEAL SYSTEM FOR LARGE TRANSLATIONS

(75) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,516

(22) Filed: Feb. 1, 2011

Related U.S. Application Data

(63) Continuation of application No. 12/808,247, filed as application No. PCT/US2009/055103 on Aug. 27, 2009, now Pat. No. 7,931,277.

(51) Int. Cl.
*F16J 15/447* (2006.01)
*F16J 15/34* (2006.01)

(52) U.S. Cl. .......... 277/416; 277/399; 277/400
(58) Field of Classification Search .......... 277/416, 277/399, 400
See application file for complete search history.

(56) References Cited

U.S. PATENT DOCUMENTS

| | | | |
|---|---|---|---|
| 5,496,047 A * | 3/1996 | Goldswain et al. | 277/400 |
| 6,692,006 B2 * | 2/2004 | Holder | 277/346 |
| 7,052,016 B2 * | 5/2006 | Tejima | 277/399 |
| 7,931,277 B2 * | 4/2011 | Garrison | 277/399 |

* cited by examiner

*Primary Examiner* — Vishal Patel
(74) *Attorney, Agent, or Firm* — Michael Crilly, Esq.

(57) ABSTRACT

A circumferential seal system for sealing a high pressure region from a low pressure region separated by a runner with an outer circumferential surface and a seal ring disposed about the outer circumferential surface is described. The seal system includes a plurality of groove sets separately disposed along the outer circumferential surface. Each groove set further includes at least two grooves. At least one groove within each groove set exerts a lifting force via a fluid from the high pressure region onto the seal ring as the runner translates with respect to the seal ring along an axis substantially perpendicular to the rotation of the runner. The continuous feed of fluid onto the seal ring ensures a thin film between the seal ring and the runner regardless of their relative arrangement during axial excursions of the runner resulting from conditions within a turbine engine.

15 Claims, 9 Drawing Sheets

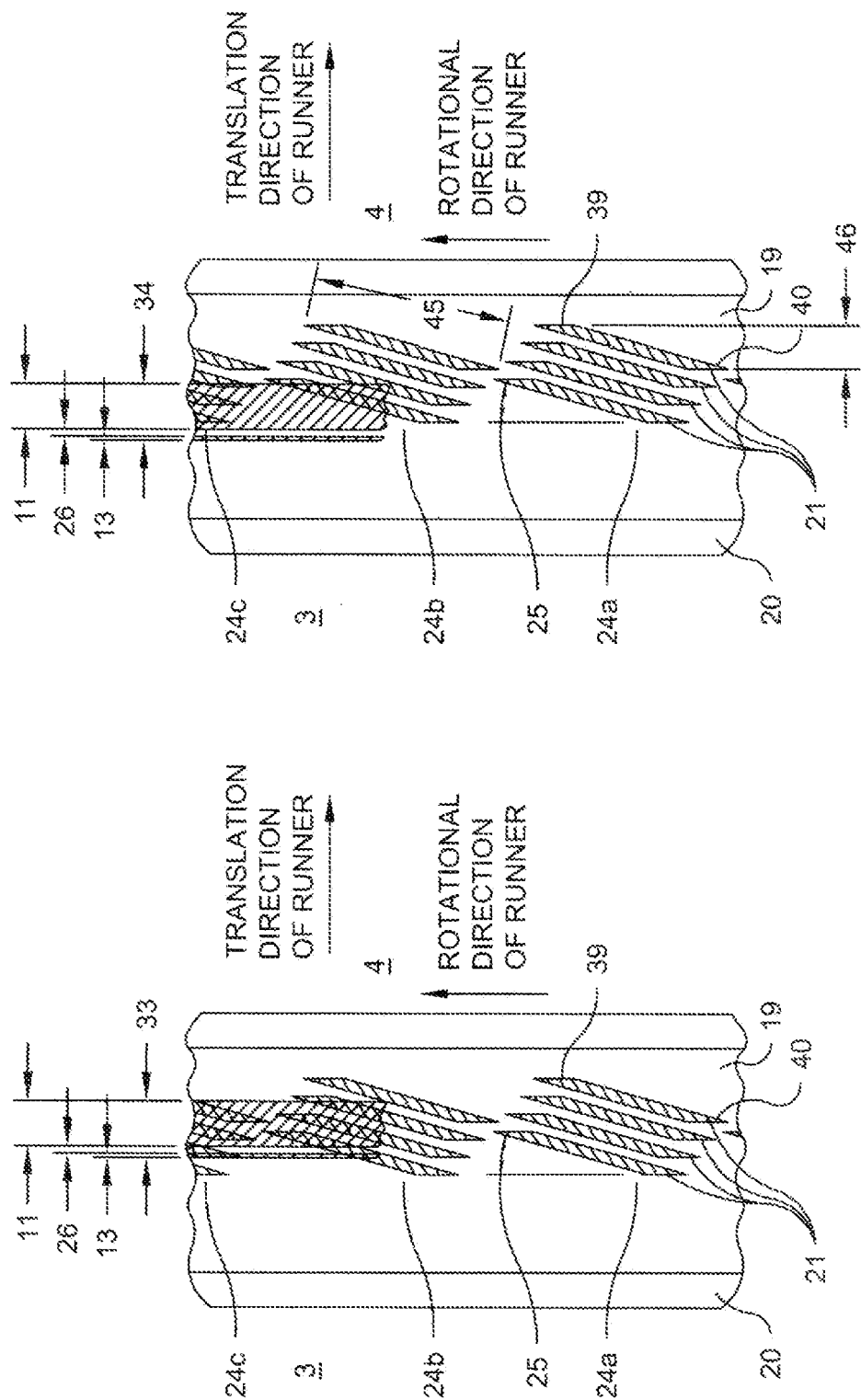

HYDRODYNAMIC CIRCUMFERENTIAL SEAL SYSTEM FOR LARGE TRANSLATIONS

CROSS REFERENCE TO RELATED APPLICATIONS

This application is a continuation of co-pending U.S. Non-Provisional Application Number 12/808,247, filed Jun. 15, 2010, which further claims priority to Patent Cooperation Treaty Application No. PCT/US2009/055103 filed Aug. 27, 2009, both entitled Hydrodynamic Circumferential Seal System for Large Translations, which are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a circumferential seal between a seal ring and a runner capable of large axial translations with respect to the seal. Specifically, the invention includes a plurality of hydrodynamic grooves disposed along the outer circumference of a runner either parallel or diagonal to the direction of rotation. Hydrodynamic grooves are further arranged into separate and distinct groove sets about the runner. Each groove set includes at least two grooves which either separately or jointly exert a hydrodynamic lifting force onto the inner diameter of the seal ring regardless of their position relative to the runner.

2. Background

There are many applications wherein housings are provided with a plurality of interior sections having rotating parts passing there through, wherein one of the interior housing sections must be isolated from another by means of a seal system. In gas turbine applications, for example, it is critical that the lubricant contained within a lubricant chamber of the housing be sealed from an adjacent fluid or gas side of the seal. This is especially true along a rotatable shaft which often passes from the lubricant side of the seal to the fluid side. In an aircraft engine, these sump seals are used to separate ambient areas of high pressure air, e.g. the gas side, from an oil wetted area at lower ambient pressures, e.g. the lubricant side. These seals prevent oil leakage from the lower pressure compartment and minimize the flow rate of hot air from the high pressure area to the oil wetted compartment.

Leakage of liquids from the lubricant side into the gas side adversely affects performance of the equipment where a seal is used. In the case of an aircraft engine, oil leakage across the seal into a hot air side may cause oil coking or an engine fire. More specifically, when an oil lubricant is used, mixing the oil with the gas could result in formation of oil coke, a byproduct of oil heated to an elevated temperature, which chemically alters the oil and is detrimental to the gas turbine. Oil coke can foul seal surfaces reducing the integrity of the seal and preventing proper bearing lubrication within the lubricant sump. Accordingly, it is important in similar applications, not just aircraft engines, that the lubricant be isolated within a lubricant sump and that the seal around the rotating shaft not allow the lubricant to escape the sump. Seals in such applications may comprise either circumferential seals or face-type seals; however, circumferential shaft seals are the most widely used under the above conditions.

The term circumferential seal broadly describes a generic type of sealing device used widely, inter alia, on aircraft engine applications. FIGS. 1a and 1b show a standard seal assembly 1 disposed about a runner 2 between a low pressure region 3 and a high pressure region 4. The seal assembly 1 supports a seal ring 6 about the runner 2 and typically includes a seal housing 5, a retaining ring 7, a back plate 8, a plurality of compression springs 9 disposed about the seal ring 6, a garter spring 10, a cavity 43, and an anti-rotation pin 14. A lift pad 11 along the seal ring 6 forms a circumferential seal with the runner 2 at the sealing radius 15 and could include a dead-end bore groove 26 and a bore dam 13 to improve sealing performance. A second surface 12 along the seal ring 6 provides a face seal with the seal housing 5.

FIGS. 2a and 2b show face and bore views, respectively, of a standard ring segment 16. A plurality of ring segments 16 typically comprises a seal ring 6. Each ring segment 16 is composed primarily of carbon and/or graphite and is arranged circumferentially around a runner 2 to form a continuous, relatively stationary seal ring 6. Each ring segment 16 includes a tongue 17 and a socket joint 18 which overlap between two adjacent ring segments 16 to restrict leakage. The related arts describe sealing rings with one or more pockets or similar structures along the bore thereof. The related arts do not provide such pockets along the outer circumferential surface 19 along the runner 2 shown in FIG. 1a.

Most current circumferential seals utilize a variant of the circumferential seal illustrated in FIGS. 1a, 1b, 2a, and 2b to address the sealing requirements between a low pressure liquid compartment and a high pressure gas compartment. In one example, Pope discloses in U.S. Pat. No. 5,145,189 a sealing ring with a shallow groove which redirects pressurized air to a plurality of deeper vent grooves. In another example, Hwang discloses in U.S. Pat. No. 6,145,843 a sealing ring with shallow lift pockets in fluid communication with a high pressure region by a plenum chamber.

The position of grooves along the bore of a sealing ring is problematic, particularly in higher-performance turbine engines. First, sealing rings are typically composed of carbon graphite and as such are prone to surface wear which compromises shallow hydrodynamic grooves along a ring. Second, the design of and operating conditions within such engines often cause the runner to widely translate along the axis of the engine. For example, axial translations in the range of a quarter of an inch are possible by a runner in some applications. Large relative movement between a runner and a sealing ring with conventional groove arrangements aligned at a single axial location allow fluid within the grooves to vent in an uncontrolled fashion. The result is a reduction or loss of the hydrodynamic lifting force exerted by the grooves onto the runner. A less robust lifting force is more likely to allow contact between the runner and sealing ring. Any such contact wears the bore surface along the sealing ring, reducing the depth and performance of the grooves over time.

As is readily apparent from the discussions above, the related arts do not include a circumferential seal which avoids the performance problems associated with seal systems that include a runner capable of large axial translations and a sealing ring with grooves along its bore.

Accordingly, what is required is a circumferential seal which maintains the lift properties between a seal ring and a seal runner during large axial excursions of the seal runner.

SUMMARY OF THE INVENTION

An object of the invention is to provide a circumferential seal which maintains the lift properties between a seal ring and a seal runner during large axial excursions of the seal runner.

In accordance with an embodiment of the invention, the circumferential seal system seals a high pressure region from a low pressure region separated by a runner with an outer circumferential surface and a seal ring including a plurality of ring segments disposed about the outer circumferential surface. The seal system includes a plurality of groove sets separately disposed along the outer circumferential surface. Each groove set includes at least two grooves. At least one groove within each groove set exerts a lifting force via a fluid from the high pressure region onto the seal ring as the runner translates with respect to the seal ring along an axis substantially perpendicular to the rotation of the runner.

In other embodiments, each groove set could include grooves which are diagonal or substantially parallel to the rotational direction of the runner.

In yet other embodiments, each groove set could include a feed groove which communicates a fluid into the grooves comprising the set. The feed groove could be perpendicular or at an angle with respect to the grooves.

In still other embodiments, grooves between adjacent groove sets could differ in number and arrangement so that grooves are offset along the outer circumferential surface.

In further embodiments, the grooves within each groove set could have different lengths or could be positioned along the outer circumferential surface so that at least one groove ensures communication of a lift force onto the bore of the seal ring before translation commences and at least one other groove ensures communication of a lift force onto the bore of the seal ring as the runner translates.

In some further embodiments, alternating groove sets could communicate a lift force onto the seal ring or at least one groove set could communicate a lift force onto each ring segment.

Several advantages are offered by the invention described herein. The invention ensures at least one groove within each groove set is disposed along the overlay region between each segment of a seal ring and a runner as the runner translates with respect to the seal ring so as to continuously communicate a hydrodynamic lifting force onto each segment. The continuous feed of pressurized fluid onto the seal ring further ensures a thin film between the seal ring and the runner regardless of their relative arrangement during axial excursions of the runner caused by temperature and other conditions immediately adjacent to the seal system. The invention places the hydrodynamic grooves along the outer diameter of the runner which is inherently more resistant to wear than the seal ring, thereby increasing seal life.

BRIEF DESCRIPTION OF THE DRAWINGS

Additional aspects, features, and advantages of the invention will be understood and will become more readily apparent when the invention is considered in the light of the following description made in conjunction with the accompanying drawings.

FIG. 1b is an enlarged cross-sectional view further illustrating features of the prior art circumferential seal assembly in FIG. 1a.

FIG. 2b is an outward radial view illustrating tongue and socket joint features along the ring segment in FIG. 2a.

FIG. 11a is an inward radial view illustrating arrangement of grooves into groove sets along the outer circumferential surface of a runner before translation thereof wherein each groove set includes substantially parallel grooves disposed at an angle with respect to the rotational direction of the runner and the seal ring includes a bore dam and a bore groove in accordance with an embodiment of the invention.

FIG. 11b is an inward radial view illustrating arrangement of groove sets with respect to the seal ring after translation of the runner in FIG. 11a.

DETAILED DESCRIPTION OF THE INVENTION

Figure 1A:
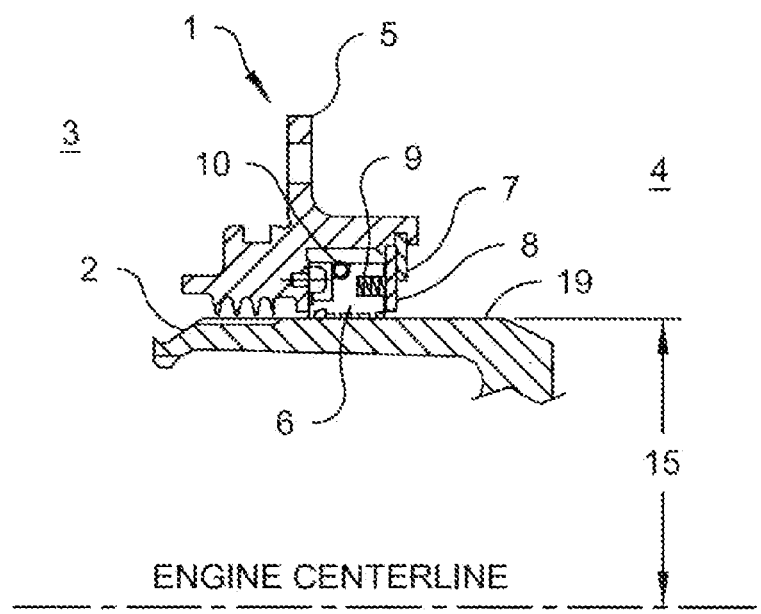
FIG. 1a is a cross-sectional view illustrating a prior art circumferential seal assembly disposed about a runner within a turbine engine.

Reference will now be made in detail to several preferred embodiments of the invention that are illustrated in the accompanying drawings. Wherever possible, same or similar reference numerals are used in the drawings and the description to refer to the same or like parts or steps. The drawings are not to precise scale.

Figure 3:
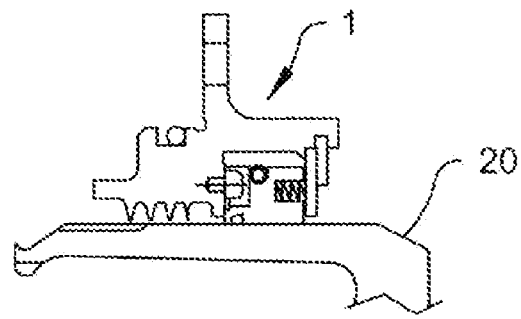
FIG. 3 is a cross-sectional view illustrating a circumferential seal assembly disposed about a runner in accordance with an embodiment of the invention.
Figure 4:
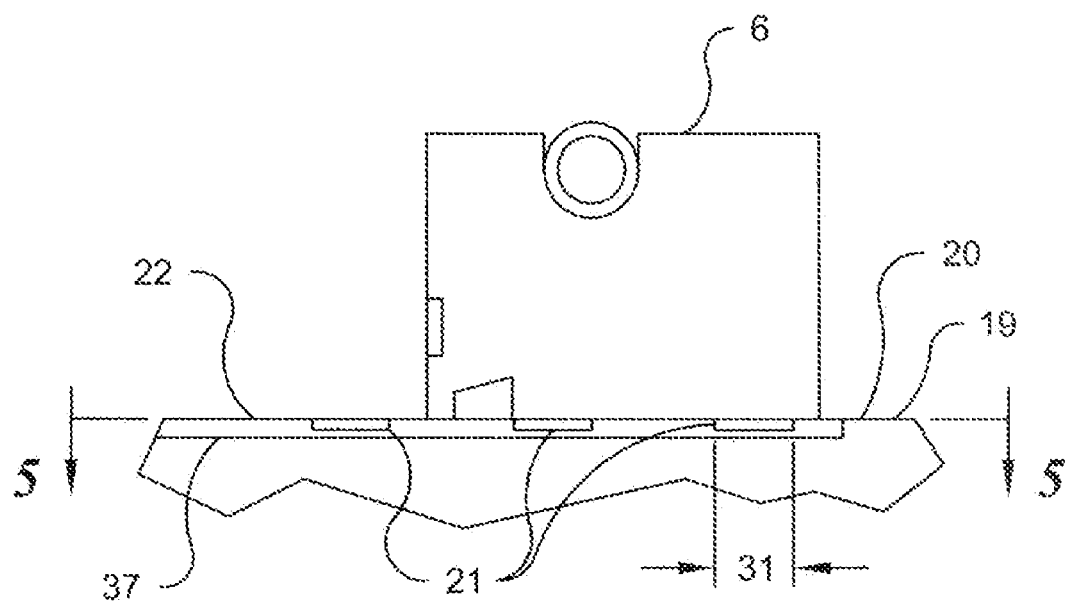
FIG. 4 is an enlarged cross-sectional view illustrating placement of hydrodynamic grooves along the outer circumferential surface of the runner in FIG. 3 which are substantially parallel to the rotational direction in accordance with an embodiment of the invention.

Referring now to FIGS. 3-4, the circumferential seal system is shown within a seal assembly 1 having a seal ring 6 therein which is adjacent to and disposed about a runner 20. The seal assembly 1 and seal ring 6 could include a variety of designs known within the art. As such, the circumferential seal system described herein could be applied to a wide variety of engines with rotating elements which traverse compartments requiring isolation from one another.

Furthermore, embodiments of the circumferential seal system described herein are applicable to both low and reverse air pressure conditions within an engine. During certain flight conditions in advanced gas turbine engines, the air pressure could be higher on the sump side than the seal chamber side causing significant oil leakage from the sump. The hydrodynamic grooves generate higher air pressure than the sump during pressure reversals, thus preventing the oil from leaking past the bore dam 13. As such, air continues to flow from the seal chamber side to the sump during pressure reversals when the pressure differential is negative.

In the instant invention, the runner 20 includes a plurality of pocket-like grooves 21 recessed along its outer circumferential surface 19. The grooves 21 could reside directly within the structure composing the runner 20 or along a coating 22 applied onto the outer circumferential surface 19.

In some embodiments, it might be advantageous to have the coating 22 recessed within a step 37 along the outer circumferential surface 19. The coating 22 is preferred to be a hard, wear resistant material applied via methods understood in the art. For example, the coating 22 could be composed of a tungsten carbide composition flame sprayed onto the outer circumferential surface 19 to form a uniform layer with a thickness from 0.003 to 0.005 inch. Grooves 21 and/or step 37 could be machined, molded, or formed into the runner 20 or coating 22 via methods understood in the art.

Figure 5:
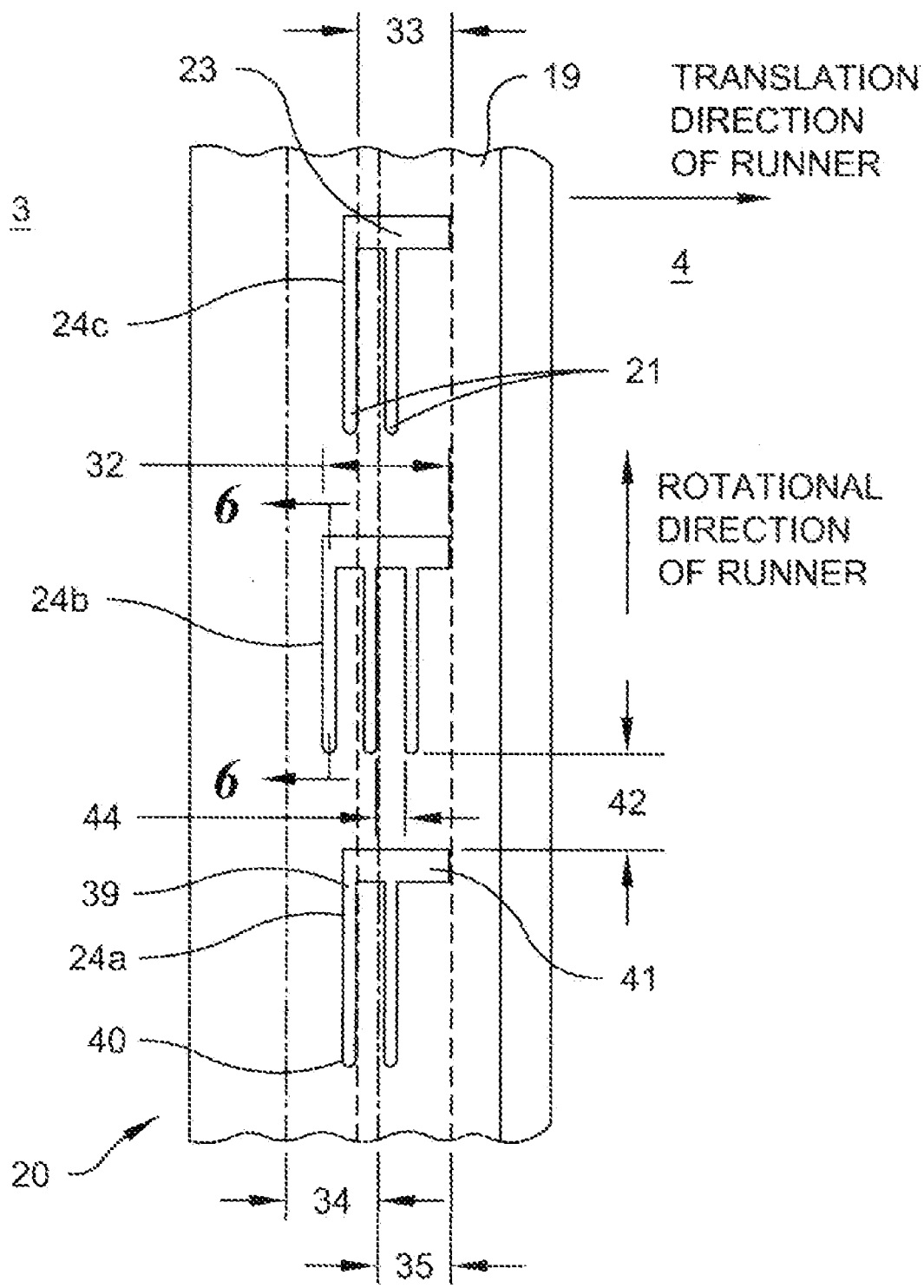
FIG. 5 is an inward radial view illustrating arrangement of grooves into groove sets along the outer circumferential surface of a runner in FIG. 4 wherein each groove set includes substantially parallel grooves communicating with and perpendicular to a feed groove in accordance with an embodiment of the invention.

Referring now to FIGS. 4-5, the grooves 21 are arranged to form distinct groove sets 24a-24c about the circumference of the runner 20 separated by a space 42. However, it is possible in some embodiments for adjacent groove sets 24a-24c to overlap or be interdigitated in a non-contacting arrangement when the second end 40 of the grooves 21 within each groove set 24a-24c is disposed in an angular and/or offset arrangement. While three groove sets 24a-24c are shown in FIG. 5, it is understood that a plurality of such structures could reside along the circumference of the runner 20. As such, the total number of groove sets 24a-24c is application and design dependent.

The grooves 21 within each groove set 24a-24c could have the same or different lengths and could include a variety of non-parallel and parallel arrangements. Each groove set 24a-24c separately directs fluid from the high pressure region 4 onto the seal ring 6. Furthermore, each groove 21 within a groove set 24a-24c could separately direct fluid onto the seal ring 6.

Figure 7:
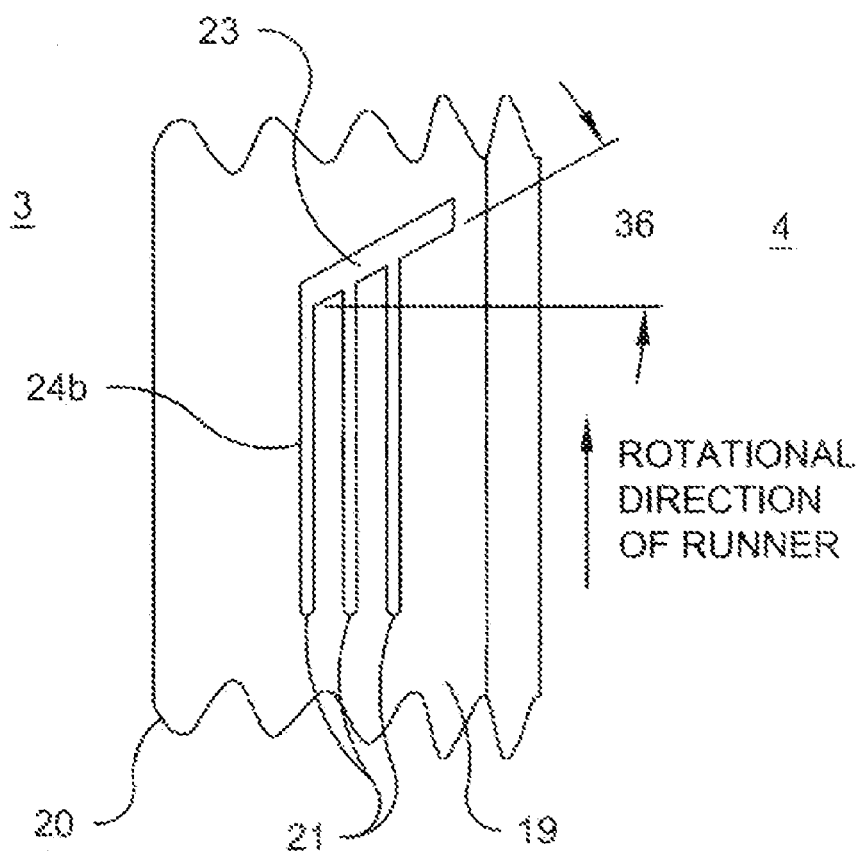
FIG. 7 is an inward radial view illustrating arrangement of grooves into a groove set along the outer circumferential surface of a runner wherein the groove set includes parallel grooves communicating with an obliquely disposed feed groove in accordance with an embodiment of the invention.

Referring again to FIG. 5, the grooves 21 are arranged in a substantially parallel configuration along the outer circumferential surface 19 of the runner 20. The grooves 21 are separated by a space 44 which could vary along a groove set 24a-24c and between and/or along adjacent grooves 21. A feed groove 23 could reside along the outer circumferential surface 19 and intersect the first end 39 of each groove 21 so as to form a continuous pathway along the feed groove 23 and each groove 21 within a groove set 24a-24c. The feed groove 23 could intersect the grooves 21 in a perpendicular arrangement, as shown in FIG. 5, or at an angle 36, as represented in FIG. 7. The inlet 41 of each feed groove 23 is preferred to be oriented towards the high pressure region 4 to facilitate communication of a fluid there from into the feed groove 23 and thereafter into each groove 21. In preferred embodiments, fluid between the seal ring 6 and runner 20 could bleed into the low pressure region 3 in a controlled fashion.

The total number of groove sets 24a-24c is determined in part by the dimensions of the seal ring 6 and runner 20, the number of ring segments 16, the length of each ring segment 16, the number and angular arrangement of grooves 21 within each groove set 24a-24c, the length, depth and width of each groove 21, the number of grooves 21 required to direct fluid under the seal ring 6 or each ring segment 16 to maintain the desired lifting force between the runner 20 and seal ring 6, the overlap or offset of grooves 21 between adjacent groove sets 24a-24c, and the maximum translation distance of the runner 20.

The number of grooves 21 within each groove set 24a-24c along the outer circumferential surface 19 could be the same or different. In FIG. 5, a groove set 24b with three grooves 21 is shown disposed between a pair of groove sets 24a, 24c with two grooves 21; however, other configurations are possible. In another more generalized example, the number of grooves 21 could vary between interposed groove sets 24a-24c such that a groove set 24b with x number of grooves 21 is disposed adjacent to groove sets 24a, 24c with x+y grooves 21, where x and y are whole numbers greater than 0.

The grooves 21 between groove sets 24a-24c could be offset as represented in FIG. 5 to further ensure communication of fluid onto the seal ring 6 along its entire translation path. The degree of offset is design dependent and could allow for no or partial overlap between one or more grooves 21 in adjacent groove sets 24a-24c.

Axial translation of the runner 20 could result from non-steady state conditions, temperatures, or other influences. In general terms, this translation is substantially parallel to the axis of rotation of the runner 20 or substantially perpendicular to the rotation of the runner 20, as represented in FIG. 5. For explanation purposes, the term overlay region represents the area along the outer circumferential surface 19 immediately below a seal ring 6 or ring segment 16. The initial overlay region 33 represents the configuration between the seal ring 6 or ring segment 16 and runner 20 at startup. In this example, the rightmost groove 21 in the outer groove sets 24a, 24c and the right two grooves 21 in the inner groove set 24b could be covered by the seal ring 6 or ring segment 16. As such, the identified grooves 21 could communicate fluid onto the seal ring 6 or ring segment 16. After the runner 20 translates to its maximum translation distance 35, the seal ring 6 or ring segment 16 covers the runner 20 along the area represented by the final overlay region 34. In this position, the leftmost groove 21 in the outer groove sets 24a, 24c and the left two grooves 21 in the inner groove set 24b could be covered by the seal ring 6 or ring segment 16. As such, the identified grooves 21 could communicate fluid under the seal ring 6 or ring segment 16. For translations between the initial and final overlay regions 33, 34, it is possible for other combinations of grooves 21 within one or more groove sets 24a-24c to communicate fluid pressure under the seal ring 6 or ring segments 16. The maximum translation distance 35 could allow some or no overlap between the initial and final overlay regions 33, 34.

Figure 6:
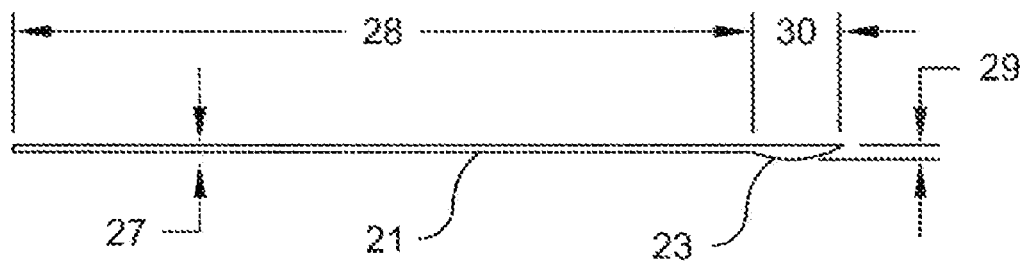
FIG. 6 is a cross-sectional view illustrating the profile of a hydrodynamic groove with feed groove along the runner in FIG. 5 in accordance with an embodiment of the invention.

Referring now to FIGS. 4-6, the profile of an exemplary groove 21 and feed groove 23 are shown. The groove 21 is represented as a structure of substantially linear extent with a length 28, uniform depth 27 and uniform width 31; however, it is possible for the depth 27 and width 31 to vary along the length 28 of the groove 21 to form a tapered or other profile. It is also possible for the groove 21 to be non-linear or arcuate along its length 28. The second end 40 of the groove 21 could terminate as a triangular, rectangular, flat, or circular structure, the latter represented in FIG. 5. Exemplary, non-limiting dimensions include 0.000010 to 0.010 inches for the depth 27, 0.010 to 1.000 inches for the width 31, 0.100 to 10.000 inches for the length 28, and 0.010 to 1.000 inches for the space 44.

The feed groove 23 is also represented as a structure of substantially linear extent with a length 32, uniform width 30, and depth 29; however, it is also possible for the depth 29 to be uniform along the length 32 and/or the depth 29 and width 30 to vary along the feed groove 23 to form a tapered or other profile. It is also possible for the feed groove 23 to be non-linear or arcuate along its length. While the feed groove 23 is shown with a curved profile, other shapes are possible. Exemplary, non-limiting dimensions include 0.000010 to 0.010 inches for the depth 29, 0.010 to 1.000 inches for the width 30, and 0.100 to 10.000 inches for the length 32.

Figure 8:
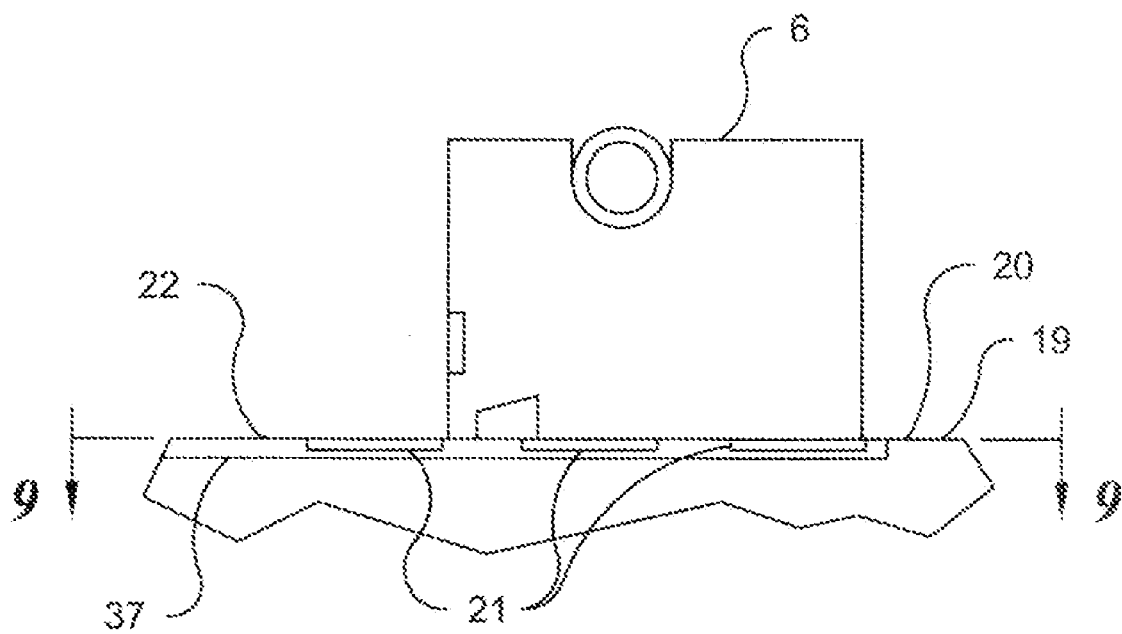
FIG. 8 is an enlarged cross-sectional view illustrating placement of grooves along the outer circumferential surface of the runner in FIG. 3 in which the grooves are diagonal to the rotational direction of the runner in accordance with an embodiment of the invention.
Figure 9:
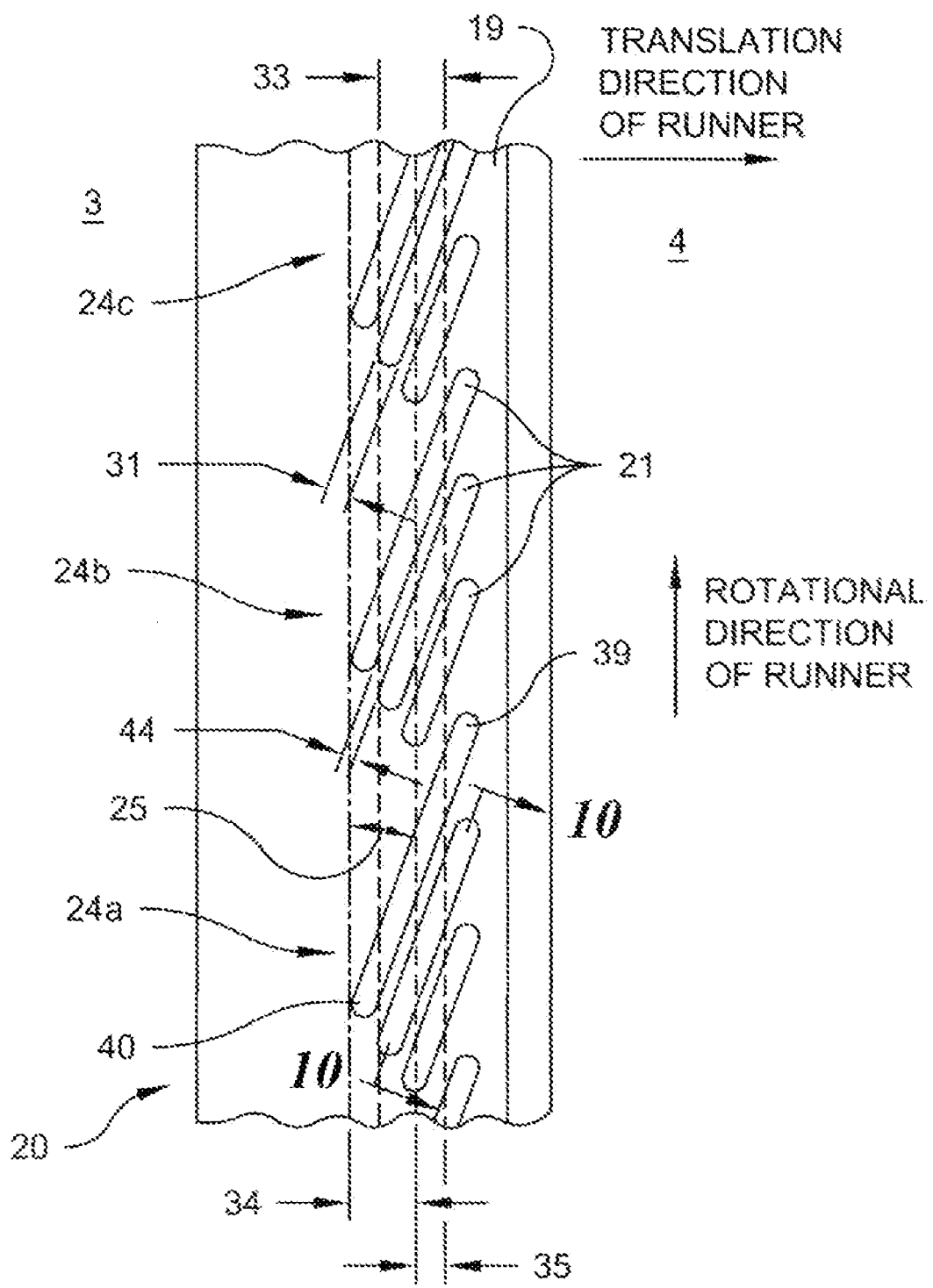
FIG. 9 is an inward radial view illustrating arrangement of grooves into groove sets along the outer circumferential surface of a runner in FIG. 8 wherein each groove set includes substantially parallel grooves disposed at an angle with respect to the rotational direction of the runner in accordance with an embodiment of the invention.

Referring now to FIGS. 8 and 9, the grooves 21 are arranged to form distinct groove sets 24a-24c along the circumference of the runner 20 with non-contacting overlap of grooves 21 between adjacent groove sets 24a-24b, 24b-24c. While three groove sets 24a-24c are shown in FIG. 9, it is understood that a plurality of such structures would reside about the circumference of the runner 20. As such, the total number of groove sets 24a-24c is application and design dependent, as described herein.

The runner 20 includes a plurality of pocket-like grooves 21 recessed along its outer circumferential surface 19. The grooves 21 could reside directly within the structure composing the runner 20 or along a coating 22 applied onto the outer circumferential surface 19. In some embodiments, it might be advantageous to have the coating 22 recessed within a step 37 along the outer circumferential surface 19. The coating 22 is preferred to be a hard, wear resistant material, as described herein, fabricated via methods understood in the art.

The grooves 21 within each groove set 24a-24c could have the same or different lengths and could include a variety of non-parallel and parallel arrangements. Each groove set 24a-24c separately directs fluid from the high pressure region 4 onto the seal ring 6. Furthermore, each groove 21 within a groove set 24a-24c could separately direct fluid under the seal ring 6 or segment 16.

In FIG. 9, the grooves 21 are arranged in a substantially parallel configuration along the outer circumferential surface 19 of the runner 20. The grooves 21 are separated by a space 44 which could vary along the groove set 24a-24c or between and/or along adjacent grooves 21. In this embodiment, the grooves 21 are set at an angle 25 with respect to the rotation direction of the runner 20 so that the first end 39 of each groove 21 is generally aligned along one side of the outer circumferential surface 19 and oriented towards the high pressure region 4. This arrangement allows communication of a fluid from the high pressure region 4 into each groove 21. The second end 40 of each groove 21 is oriented towards the low pressure region 3 so as to terminate each groove 21 at a different distance from the high pressure region 4. This arrangement ensures one or more second ends 40 within a groove set 24a-24c communicate fluid onto the seal ring 6 or ring segment 16 during translation of the runner 20. In preferred embodiments, fluid between the seal ring 6 and runner 20 could bleed into the low pressure region 3 in a controlled fashion. The total number of groove sets 24a-24c is application and design dependent, as described herein.

The number of grooves 21 within each groove set 24a-24c along the outer circumferential surface 19 could be the same or different. In FIG. 8, each groove set 24b is shown with three grooves 21 of varying length; however, other configurations are possible including without limitation grooves 21 with non-parallel sides forming a point shaped or truncated end.

In this embodiment, the initial overlay region 33 could be the configuration between the seal ring 6 or ring segment 16 and runner 20 at startup. In one example, the seal ring 6 or ring segment 16 could overlay a portion of the two rightmost grooves 21 so as to cover the second ends 40 thereof. As such, the identified grooves 21 could communicate fluid onto the seal ring 6 or ring segment 16. After the runner 20 translates to its maximum translation distance 35, the seal ring 6 or ring segment 16 could cover the runner 20 along the area represented by the final overlay region 34. In this position, the leftmost grooves 21 within the groove sets 24a-24c could overlay the seal ring 6 or one or more ring segment 16 so as to cover the second ends 40 thereof. As such, the identified grooves 21 could communicate fluid onto the seal ring 6 or the ring segments 16. For translations between the initial and final overlay regions 33, 34, it is possible for at least the center groove 21 or other combinations of grooves 21 within one or more groove sets 24a-24c to communicate fluid onto the seal ring 6 or ring segments 16. The maximum translation distance 35 could allow some or no overlap between the initial and final overlay regions 33, 34.

Figure 10:
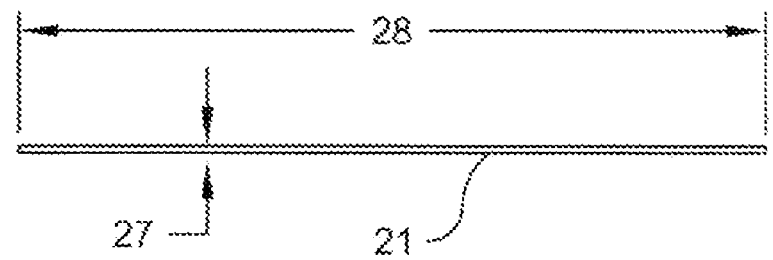
FIG. 10 is a cross-sectional view illustrating the profile of a hydrodynamic groove along the runner in FIG. 9 in accordance with an embodiment of the invention.

Referring now to FIGS. 9-10, the profile of an exemplary groove 21 is shown. The groove 21 is represented generally as a linear structure with a length 28, depth 27 and width 31 of uniform dimensions; however, it is possible for the depth 27 and width 31 to vary along the length 28 of the groove 21 or to form various profiles. It is also possible for the groove 21 to be non-linear or arcuate along its length 28. The second end 40 of the groove 21 could terminate as a triangular, rectangular, circular, or flat structure, the latter two represented in FIGS. 9 and 11a, respectively. Exemplary, non-limiting dimensions include 0.000010 to 0.010 inches for the depth 27, 0.010 to 1.000 inches for the width 31, 0.100 to 10.000 inches for the length 28, and 0.010 to 1.000 inches for the space 44.

Referring now to FIGS. 11a-11b, another embodiment of the invention in FIGS. 8-9 is shown including a plurality of grooves 21 arranged into separate and non-overlapping groove sets 24a-24c disposed in a substantially parallel configuration along the outer circumferential surface 19 of the runner 20. In this embodiment, the grooves 21 are set at an angle 25 with respect to the rotation direction of the runner 20 so that the first end 39 of each groove 21 is generally oriented towards the high pressure region 4. This arrangement allows communication of fluid from the high pressure region 4 into the grooves 21 depending on the position of the seal ring 6. The second end 40 of each groove 21 is oriented towards the low pressure region 3 so as to terminate each groove 21 at a different distance from the high pressure region 4. Further, the first end 39 and second end 40 are truncated to form a point such that the leftmost side of the point for the second end 40 and rightmost side of the point for the first end 39 are parallel to the sides of the seal ring 6. This arrangement ensures one or more second ends 40 within a groove set 24a-24c communicate fluid onto the seal ring 6 or ring segment 16 during translation of the runner 20.

Figure 1B:
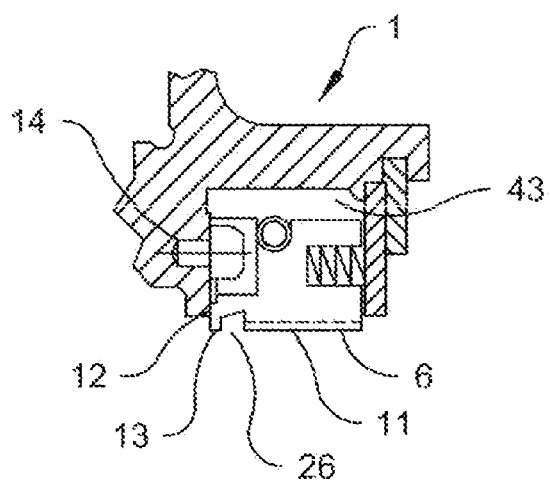
Figure 2A:
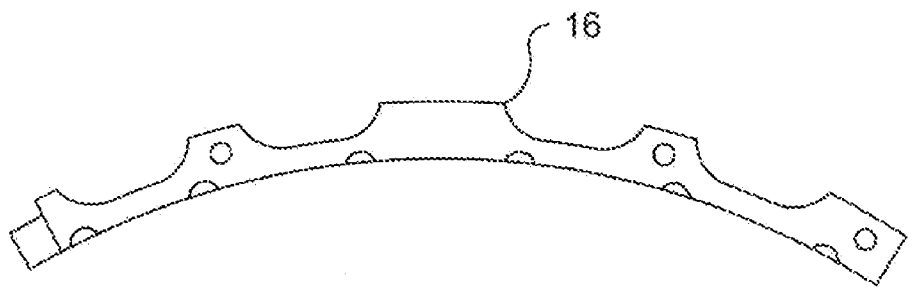
FIG. 2a is a side elevation view illustrating a ring segment from a prior art circumferential seal.
Figure 2B:
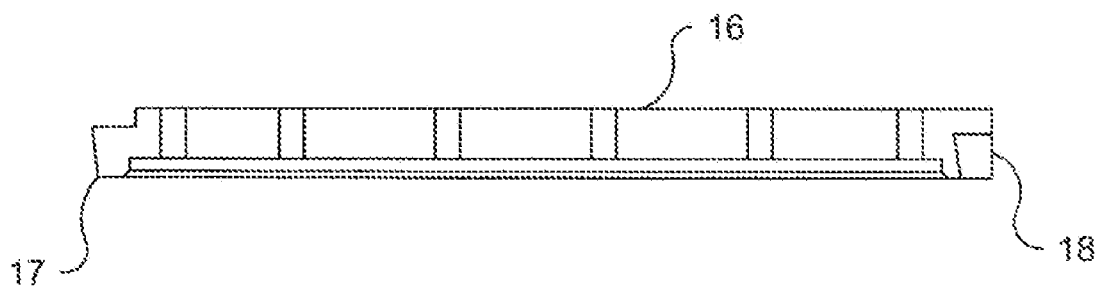

In this embodiment, the initial overlay region 33 could be configured so that the lift pad 11, bore groove 26, and bore dam 13 along the seal ring 6 or ring segment 16 in FIG. 1b overlay a portion of the three rightmost grooves 21, as graphically represented in FIGS. 11a-11b, so as to cover the second ends 40 thereof. As such, at least the two rightmost grooves 21 could communicate fluid onto the seal ring 6 or ring segment 16. After translation of the runner 20, the lift pad 11, bore groove 26, and bore dam 13 could cover the runner 20 along the area represented by the final overlay region 34. In this position, the two leftmost grooves 21 within each groove set 24a-24c could overlay the lift pad 11 so as to cover the second ends 40 thereof. As such, the identified grooves 21 could communicate fluid onto the seal ring 6 or the ring segments 16. For translations between the initial and final overlay regions 33, 34, it is possible for the lift pad 11, bore groove 26, and/or bore dam 13 to interact with one or more grooves 21 within each groove set 24a-24c to communicate fluid onto the seal ring 6 or ring segments 16.

In some embodiments, the length 45 of the grooves 21 could be such that the effective width 46 of each groove 21 is equal to or less than the width of at least the lift pad 11 along the seal ring 6 to cut off the flow path of fluid from the high to low pressure regions 4, 3 at some point during axial translations. This arrangement could prevent high pressure from entering the high pressure end of a groove 21 once it is underneath or overlaid by the seal ring 6.

Figure 12:
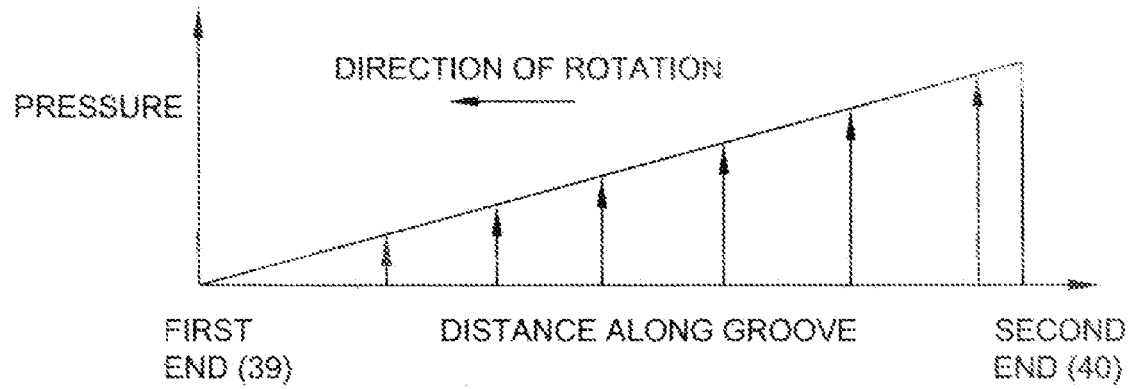
FIG. 12 is a plot illustrating an exemplary pressure field within a hydrodynamic groove in accordance with an embodiment of the invention.

Referring now to FIG. 12, an exemplary pressure profile is shown for the fluid along the length 28 of a groove 21, assuming the groove 21 is nearly completely overlaid by a seal ring 6 or one or more ring segments 16. In this example, the pressure at the first end 39 could be nearly zero or an ambient value and steadily increase along the length 28 of the groove 21 to a maximum value at the second end 40. In other examples, the minimum pressure might occur at a location along the groove 21 when the seal ring 6 or a ring segment 16 first overlays the groove 21. In yet other examples, the pressure could have a non-linear profile dependent on the interface conditions between the seal ring 6 or the ring segment 16 and the runner 20, dimensions of one or more grooves 21, and other factors.

Generally, it is desired for a seal ring 6 or one or more ring segments 16 to substantially overlay the length 28 of a groove 21 so as to maximize the lift force communicated from the runner 20 to the seal ring 6 or ring segments 16. It is also possible for the groove 21 to adequately communicate a lift force onto a seal ring 6 or ring segment 16 when the groove 21 is partially covered so as to overlay a region adjacent to the second end 40. When grooves 21 within a groove set 24a-24c are of different lengths, at least one groove within each groove set 24a-24c should be sufficiently long so as to ensure a lifting force between the runner 20 and seal ring 6 before translation of the runner 20 and at least one other groove 21 should be sufficiently long so as to ensure maintenance of a lifting force as the runner 20 along the translation path of the runner 20. It is also possible for the grooves 21 to be separately located along the outer circumferential surface 19 so that at least one groove 21 ensures formation of a lift force between the runner 20 and the seal ring 6 before translation and at least one other groove 21 maintains the lifting force across the translation path of the runner 20.

The circumferential seal systems described herein direct fluid from the high pressure region 4 into a plurality of groove sets 24a-24c separately disposed along the outer circumferential surface 19. Thereafter, the fluid is communicated from at least one groove 21 within each groove set 24a-24c onto the seal ring 6 as the runner 20 translates with respect to the seal ring 6 along an axis substantially perpendicular to the rotation of the runner 20. This fluid forms a thin film which is sufficient to generate a lifting force along the seal ring 6 so as to move the seal ring 6 away from the outer circumferential surface 19. In some embodiments, the lifting force could be generated by at least one groove 21 within at most every other groove set 24a-24c.

Figure 13:
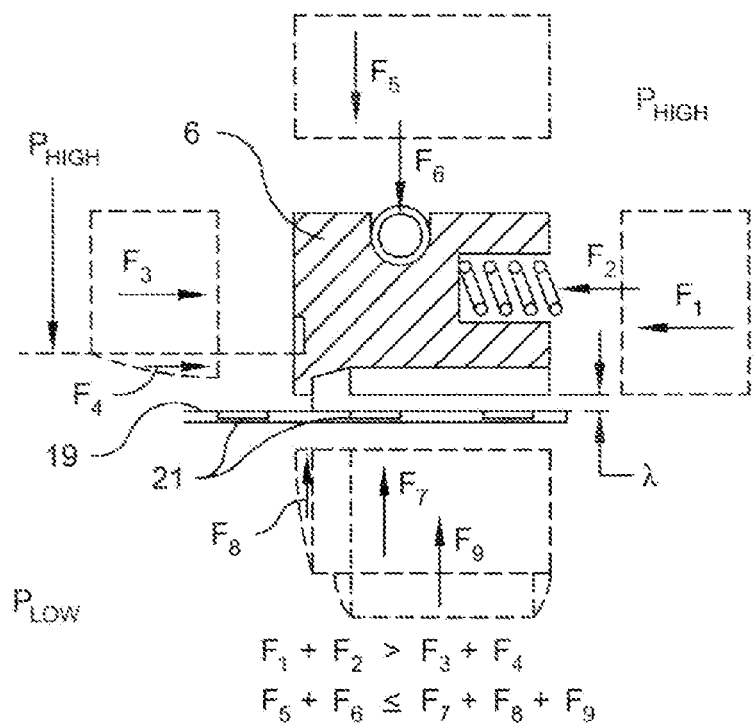
FIG. 13 is a schematic diagram illustrating the forces about a seal ring with hydrodynamic grooves disposed along the outer circumferential surface of a runner in accordance with an embodiment of the invention.

Referring now to FIG. 13, the force balance which produces the hydrodynamic operating clearance, h, between a seal ring 6 and runner 20 when the instant invention is applied to the components shown in FIGS. 1a and 1b, is graphically represented about a seal ring 6 with specific reference to forces $F_1$ through $F_9$.

Loading conditions along the axial direction generally include four primary components. The right side of the seal ring 6 includes force $F_1$ produced by the high pressure region 4 and force $F_2$ exerted by the compression springs 9. The left side of the seal ring 6 includes the reaction force $F_3$ at the interface between the seal housing 5 and seal ring 6 along the second surface 12 and force $F_4$ produced by the pressure breakdown over the face dam. The total magnitude of forces $F_1$ and $F_2$ should exceed that of the total magnitude of forces $F_3$ and $F_4$ so as to secure the seal ring 6 axially against the seal housing 5.

Loading conditions along the radial direction generally include five primary components. The outer circumference of the seal ring 6 includes force $F_5$ produced by pressurized fluid from the high pressure region 4 within the cavity 43 between the seal ring 6 and seal housing 5 and force $F_6$ exerted by the garter spring 10. The inner circumference of the seal ring 6 includes force $F_7$ resulting from high pressure surrounding the lift pad 11, force $F_8$ resulting from the pressure breakdown under the bore dam 13, and force $F_9$ produced by fluid directed onto the seal ring 6 by the hydrodynamic grooves 21 as described herein. The total magnitude of forces $F_5$ and $F_6$ should be equal to or less than the total magnitude of forces $F_7$, $F_8$, and $F_9$ at steady-state conditions so that the seal ring 6 is maintained at a distance from the otherwise rotating runner 20 while minimizing flow from the high pressure region 4 to the low pressure region 3. During non steady-state conditions, the total magnitude of forces $F_5$ and $F_6$ should be less than that of forces $F_7$, $F_8$, and $F_9$ so that the seal ring 6 is forced or pushed away from the rotating runner 20 at startup and allowed to move towards and eventually contact the runner 20 at shutdown. The hydrodynamic seal rides on a fluid film and is non-contacting for the purpose of increasing seal life, reducing heat generation, and could reduce or eliminate the need to cool the runner 20 with oil in turbine engines.

As is evident from the explanation above, the circumferential seal system and variations thereof maintain the sealing properties of the system at an interface which exhibits large relative axial translations. The invention is expected to be used within applications wherein a housing is provided with a plurality of interior sections having rotating parts passing there through, wherein one of the interior housing sections must be isolated from another by means of a seal system. One specific non-limiting example is a turbine engine.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A circumferential seal system sealing a high pressure region from a low pressure region separated by a runner with an outer circumferential surface and a seal ring including a plurality of ring segments disposed about said outer circumferential surface comprising:

a plurality of groove sets separately disposed along said outer circumferential surface and diagonal to rotation of said runner, each said groove set including at least two grooves, each said groove having a first end and a second end with said first end closer to said high pressure region, said first ends within each said groove set at different distances from said high pressure region, at least one said first end within each said groove set communicates with said high pressure region so that a fluid from said high pressure region enters at least one said groove, said second ends within each said groove set located at different distances from said high pressure region, said second end of at least one said groove within each said groove set communicates said fluid onto said seal ring as said runner translates with respect to said seal ring, said fluid produces a lift force between said seal ring and said runner.

2. The circumferential seal system of claim 1, wherein at least one said first end or at least one said second end is truncated.

3. The circumferential seal system of claim 1, wherein the length of said grooves is such that the effective width of each said groove is equal to or less than the width of the lift surface along said seal ring to terminate the flow path of said fluid from said high pressure region to said low pressure region.

4. The circumferential seal system of claim 1, wherein said grooves within each said groove set are different lengths or located along said outer circumferential surface so that at least one said groove is sufficiently long so as to ensure said lift force before translation of said runner and at least one other said groove is sufficiently long so as to ensure said lift force as said runner translates.

5. The circumferential seal system of claim 1, wherein at most every other said groove set has at least one said groove which communicates said fluid onto said seal ring.

6. The circumferential seal system of claim 1, wherein at least one said groove set communicates said fluid onto each said ring segment.

7. The circumferential seal system of claim 1, wherein said seal ring includes a bore dam and a bore groove adjacent to said outer circumferential surface.

8. The circumferential seal system of claim 1, wherein said seal ring is disposed within a seal assembly.

9. The circumferential seal system of claim 1, wherein said circumferential seal system is disposed within a turbine engine.

10. The circumferential seal system of claim 9, wherein said circumferential seal system prevents leakage during low or reverse air pressure conditions within said turbine engine.

11. A method of sealing a high pressure region from a low pressure region separated by a runner with an outer circumferential surface and a seal ring including a plurality of ring segments disposed about said outer circumferential surface comprising the steps of:
 (a) directing a fluid from said high pressure region into a plurality of groove sets separately disposed along said outer circumferential surface, each said groove set including at least two grooves disposed diagonal to rotation of said runner, each said groove including a first end and a second end with said first end closest to said high pressure region, said first ends within each said groove set at different distances from said high pressure region, said second ends within each said groove set located at different distances from said high pressure;
 (b) communicating said fluid from said second end of at least one said groove within each said groove set onto said seal ring as said runner translates with respect to said seal ring; and
 (c) generating a lift force along said seal ring via less than all said grooves within each said groove set with said fluid as said runner translates with respect to said seal ring.

12. The method of claim 11, wherein at least one said first end or at least one said second end is truncated.

13. The method of claim 11, wherein at least one said groove communicates said fluid under each said ring segment.

14. The method of claim 11, wherein at most every other said groove set has at least one said groove which communicates said fluid under said seal ring.

15. The method of claim 11, wherein at least one said groove set communicates said fluid under each said ring segment.

* * * * *